Jan. 9, 1934.　　　F. H. GLEASON　　　1,943,014
LUBRICATING SYSTEM
Filed Sept. 28, 1926　　　2 Sheets-Sheet 1

INVENTOR.
F. H. Gleason
BY
Ewison Shompon
ATTORNEYS.

WITNESS
H. W. Hurst.

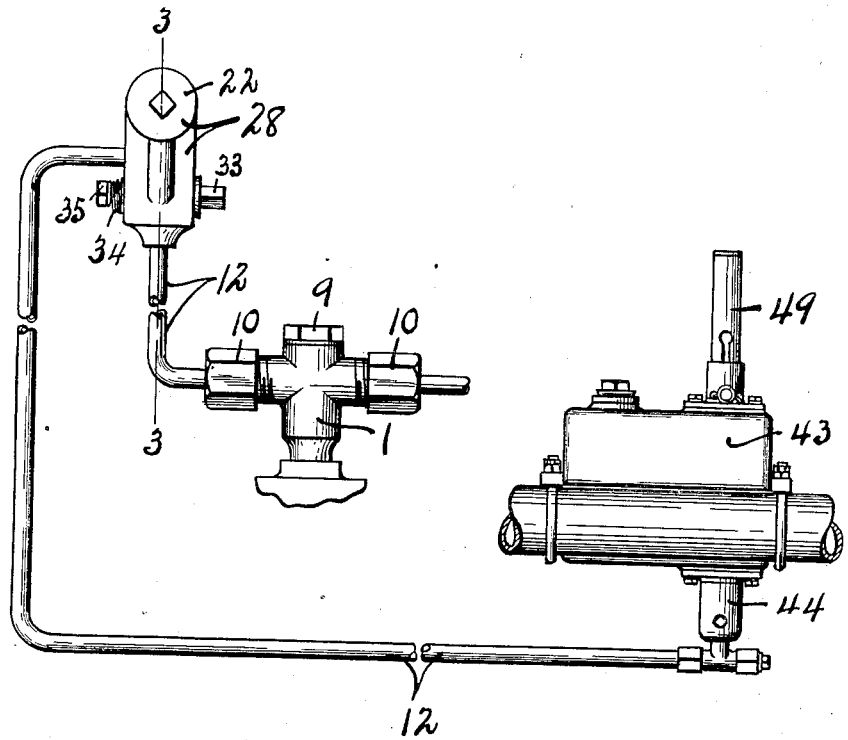
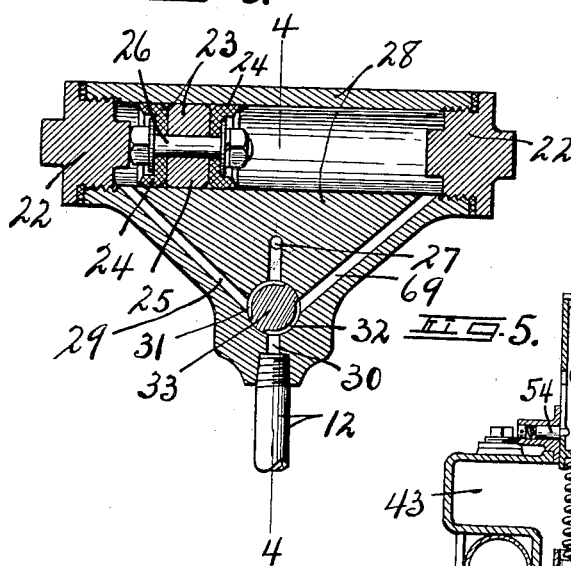
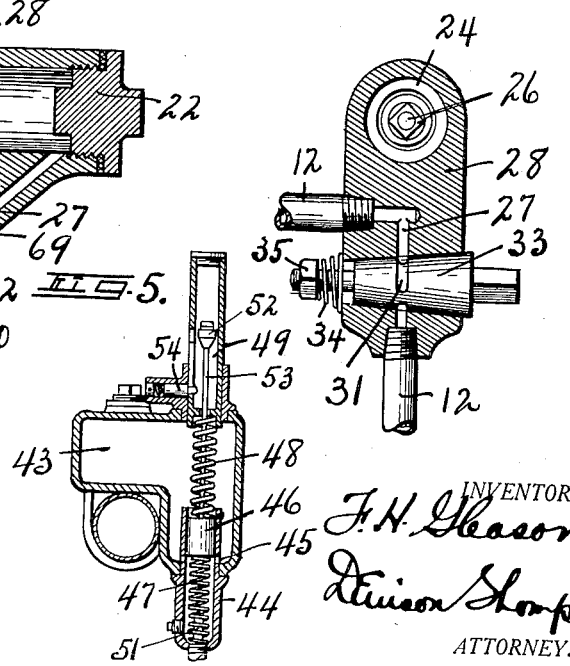

Patented Jan. 9, 1934

1,943,014

UNITED STATES PATENT OFFICE 1,943,014

LUBRICATING SYSTEM

Frederick H. Gleason, Auburn, N. Y.

Application September 28, 1926
Serial No. 138,235

6 Claims. (Cl. 184—7)

This invention relates more specifically to a lubricating system adapted to automatically deliver predetermined volumes of lubricant to the various bearings of machine tools, the chassis bearings of an automobile, the bearings of a locomotive and other associated types of machinery which have many bearings requiring periodic lubrication, said bearings being located at varying distances from the source of oil supply and requiring varying amounts of oil.

The system in general comprises a means for supplying a measured volume of oil under pressure to a single tube delivery system, the delivery system having restricting means at each outlet for varying the volume delivered through each outlet, and also means for preventing the flow of oil through the outlets except under pressure from the source of oil supply under pressure.

The restricting means in each outlet provides a means for balancing the various outlets against each other, and so providing for delivering a predetermined volume of the oil supplied by the supply means at each particular outlet.

Figure 2 is an elevation of a modified form of the invention.

Figure 3 is a section on line 3—3, Figure 2.

Figure 4 is a section on line 4—4, Figure 3.

Figure 5 is a vertical section through the pump illustrated in Figure 2.

Figure 1:
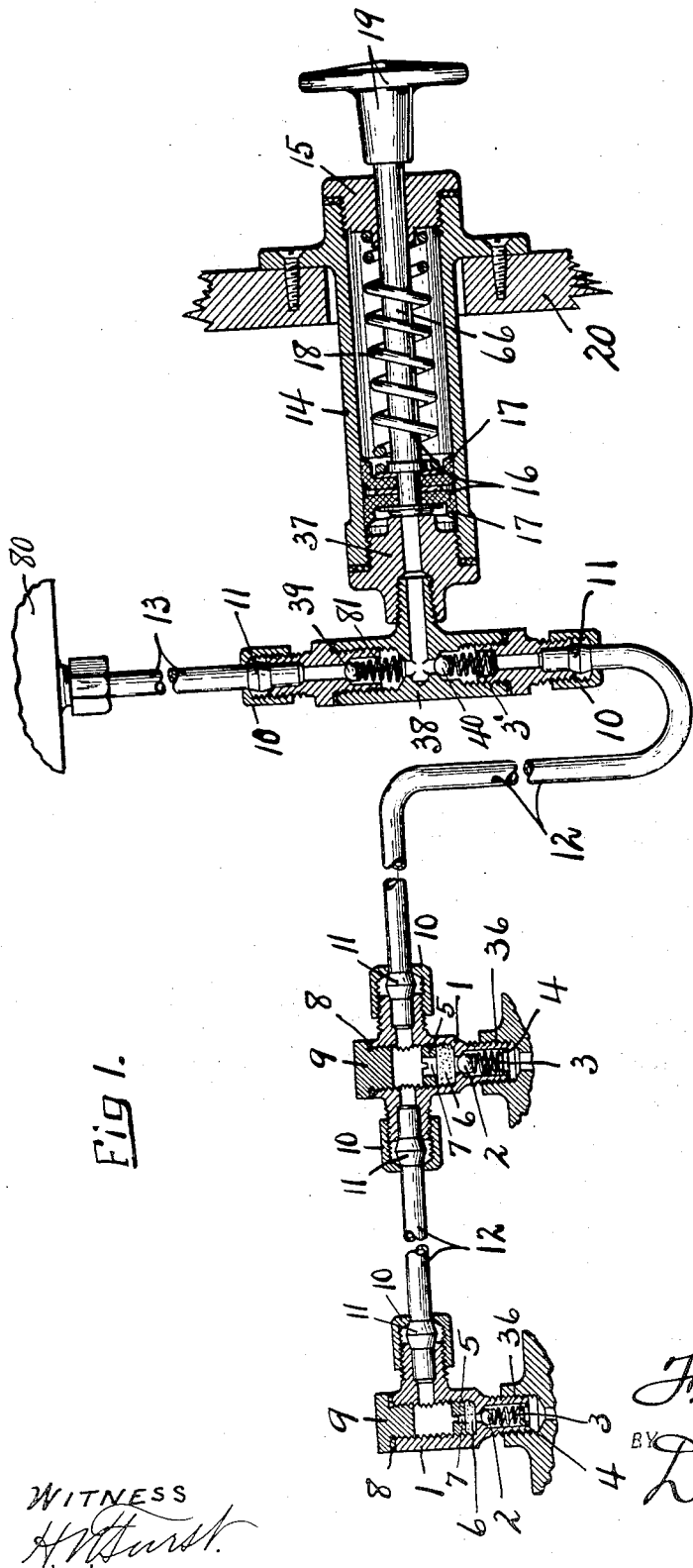
Figure 1 is a sectional view of an embodiment of this invention.

The apparatus disclosed in Figure 1 comprises a cylinder 14 within which is arranged a plunger assembly 16 which includes two leather cup washers 17 fastened to the end of plunger 66 and adapted to operate in the bore of the cylinder 14. The plunger extends outwardly through a plug 15 threaded into one end of the cylinder 14 and the plunger is provided with a knob 19 adapted to be operated by hand.

Spring 18 is positioned between the inner end of the plug 15 and the adjacent side of the piston including the cup washers 17 and their supporting metallic disks.

The outlet end of the cylinder 14 is provided with a threaded cap 37 to which a valve body 38 is attached by means of a threaded portion. This valve body is provided with an oil passage connecting with the interior of the cylinder 14 through the cap 37 and has oppositely disposed valve seats for the reception of inlet valve 39 and outlet valve 40 respectively. The inlet valve 39 is normally held to its seat by spring 81 to prevent the entrance of lubricant as from an oil reservoir 80 to the valve body. The outlet check valve 40 is normally held to its seat to prevent the return of lubricant from the system, as by means of spring 3'. The connection between the oil supply tube 13 and the valve body is here made by the use of a tubing nut 10 and a tubing sleeve 11 of ordinary construction, and in like manner the outlet tube 12 extending from the pump structure to the delivery controls hereinafter described is made by the use of a tubing sleeve 11 and a tubing nut 10 of ordinary construction.

The pump structure may be attached to any convenient support 20 as by means of a flanged portion upon the cylinder 14, and this support 20 may be the dash or instrument board of an automobile chassis.

The pipe 12 in this particular illustration leads to the upper portion of a control device having a T-tubing connection and another tube 12 leads from this T-tubing connection to a second control device having an elbow tubing connection, the tube 12 being connected to its respective tubing connections by means of tubing sleeves 11 and tubing nuts 10.

This illustration discloses but two control devices, but it will be obvious that any number of such devices may be connected in a single series for the simultaneous receipt of lubricant from tube 12. Each of the control devices discloses a body 1 and as here illustrated, the elbow tubing connection and the T-tubing connections are formed integral with the body 1, but such relation is not, however, essential. In each case the body 1 is provided with a threaded portion 36 for attachment to a bearing or point which is to be supplied with lubricant and the tubes 12 are connected to the respective tubing connections in the manner heretofore described.

In the structures here shown, the bodies 1 are each formed with an interior substantially cylindrical chamber closed at its bottom except for an outlet opening controlled by a ball valve 2 pressed by spring 3 against a seat formed on the lower side of the wall bordering the outlet opening. The spring 3 may be held in the body 1 by a perforated plug 4 having a drive fit in the body 1. The cylindrical chamber in each body 1 is preferably interiorly threaded throughout its length, and is closed at its upper end by a removable cap or plug 9, which upon removal permits access to the chamber and a lubricant-tight joint is assured by the packing 8 positioned between the wall of the body 1 and the head of the plug 9. A round disk 6 of felt is held in the body 1 preferably just above the outlet opening and rests upon the bottom wall of the cylindrical chamber in the body 1, and this disk may be compressed to any required density by a ring or annular member 5 having a threaded relation with the wall of the cylindrical chamber in the body 1, and this disk is provided with a screw driver slot for adjustment, and with a drilled oil passage 7 which can be made of any required area to aid in restricting the flow of oil through the control.

In the structure illustrated in the drawings, two different size oil passages have been shown and the felt disks are compressed to different degrees by their respective threaded disks 5.

The general operation of this system is as follows:

When the plunger assembly, including the cup washers 17 and plunger 16 is drawn out by pulling on the knob 19, oil is drawn from the oil reservoir 80 through the tube 13 and past check valve 39 into the pump cylinder 14. The spring 18 is compressed by this movement of the plunger assembly and when the knob 19 is released, the spring 18 applies pressure to the oil in the cylinder 14. This pressure assists spring 81 in holding valve 39 to its seat and at the same time opens valve 40 against the action of its spring 3' and the oil is forced into the tube 12 which connects the pump structure with the outlet delivery controls.

The oil is supplied to the cylindrical chambers within the controls and in the illustrative structures here described the control having the T-tubing connection includes a threaded disk 5 with a comparatively large oil passage 7 while the control having the elbow tubing connection includes a disk 5 having a relatively small oil passage 7, the latter disk being adjusted to compress the felt disk to a much greater density than the density of the disk in the other control.

As a result the volume of oil supplied to each bearing can be predetermined in that the volume of oil supplied by the pump assembly at each operation to tube 12 will be delivered at the respective outlets from the control devices in proportions or volumes varying directly as the resistances developed by the relative control devices.

As before stated, any number of controls can be assembled in a system with connecting tubes 12 and connected with a source of measured oil supply and the volume of oil delivered at any particular outlet can be regulated by varying the resistance to the flow of oil through the controls as compared with each other. Any desired proportion of the volume of oil supplied by the pump assembly to the system at each operation can be delivered at any particular outlet.

The check valves 2 controlling the outlets from the control devices prevent any flow of oil under gravity head when the system is standing idle, but allow flow of oil under pressure from the pump. The pressure required to force oil through the check valves in the controls being approximately the same for all controls, these valves can be disregarded in making adjustments for regulating the flow resistance through each control device.

In Figures 2 to 5 a modified structure is shown which may be used in connection with any pump capable of producing a pressure in the system, and the pump illustrated is the same as that disclosed in my co-pending application Serial No. 498,740 filed September 6, 1921, which has become Patent No. 1,629,453 issued May 17, 1927 and as shown in Figures 2 and 5 comprises in general a reservoir 43, a cylinder 44 at the lower end of the reservoir and having a portion projecting upwardly into the reservoir and provided with ports 45 permitting the flow of oil from the reservoir to the cylinder. Piston 46 is arranged in the cylinder, and is normally held at the limit of its upward movement by spring 47, a second spring 48 being confined between the upper end of the piston 46 and the lower end of a piston-actuating member 49, in this instance in the form of a cylinder. The outlet from the pump is provided with a spring closed check valve and a screen 51 preferably surrounding the opening.

It will be obvious that with this structure, the ejection of oil into the tubes 12 is effected wholly by the application of spring pressure. When the cylinder 49 is moved downwardly, its movement is transferred to piston 46 through the medium of spring 48, which spring as compressed overcomes the tension of spring 47 and the piston 46 moves downwardly in the cylinder to eject the lubricant therefrom, and this movement of piston 46 continues until a balance is reached between the spring pressures upon opposite sides of the piston, the header 52 on rod 53 connected to piston 46 acting to shift the pawl 54 rearwardly to release the actuating member 49 and permit its return to the position shown in Figure 5.

However, in place of this pump or any other pump which will produce or preferably maintain a pressure in the system, the tube 12 may be connected to any source of lubricant supply under pressure, as for instance the pressure system for the engine bearings of an automobile.

The same control devices including body 1, etc. may be utilized in this system for regulating the amount of lubricant supplied to each bearing, and for the purpose of supplying a measured amount of lubricant to the system at each operation, a measuring device is inserted in the pipe 12. This measuring device includes a body 28 preferably having an interior cylindrical chamber or space in which a piston assembly 23 is adapted to operate. This piston assembly 23 comprises two opposed leather cup-washers 24 secured to a spacer disk 25 by means of a bolt and nut 26. The ends of the cylindrical chamber are closed by threaded plugs 22 and these plugs also provide stops to limit the stroke of the piston assembly 23.

A four-way valve assembly is provided in the body 28 as by a tapered valve key 33 held in a tapered seat in the body 28 by spring 34 and nut 35. This tapered valve key is provided with opposed oil passages 31 and 32. An inlet oil passage 27 is located diametrically to an outlet oil passage 30 and the inlet oil passage is connected to the pipe 12 leading from the pump and the outlet oil passage is connected to the pipe 12 leading to the control devices.

Oil passages 29 and 69 connect the opposite ends of the cylindrical chamber in body 28 with the tapered key valve oil passages 31 and 32. The system leading from the outlet oil passage 30 may include any number of control devices for supplying lubricant to a pre-determined number of bearings.

The operation of this device may be generally described as follows:

When the key valve 33 is turned, as shown in Figure 3, oil under pressure from the supply tube 12 passes through oil passages 27, 31 and 29 into one end of the cylindrical chamber in the body 28 and forces the piston assembly to the right end of the cylinder and the piston assembly in moving to the right end of the cylinder forces the measured volume of oil in the right end of the cylinder through oil passages 69, 32 and 30 into the distribution system and through the control devices.

When the taper key valve is turned the other way, so as to place the inlet 27 in communication with the passages 32 and 69, the piston assembly 23 reverses in movement and forces the oil in the left end of the cylinder into the distribution system. It will be apparent that a measured volume of oil under pressure is supplied to the distribution system each time the taper key valve 33 is operated.

The system herein illustrated delivers a measured volume of oil to a distribution system through spring pressure, the distribution system comprising tubing and control devices with restricting or balancing means located in the control devices and check valves provided in the outlets from the control devices to prevent flow of oil except under pressure from the source of oil supply, and altho I have shown and described specific structures as illustrative of a preferred embodiment of the invention, I do not desire to restrict myself to the details of the structure or the form and relation of the parts thereof, as various changes and modifications may be made within the scope of the appended claims.

I claim:

1. In a centralized lubricating installation for a mechanism having a plurality of distributed bearings to be lubricated, said installation being of the type comprising a central reservoir and pump and a branched conduit system for conducting lubricant from the pump to a plurality of outlets connected to said bearings, said outlets each including an apportioning unit; each apportioning unit comprising a fitting element having a cavity and provided with an inlet portion receiving lubricant from the conduit system and an outlet portion feeding lubricant to the respective bearing, said inlet and said outlet portions being in communication with said cavity, a capillary filler member contained in said cavity and an annular gasket held against one end of said member, said gasket determining the proportionate rate of flow to the respective bearing to which the outlet is connected in accordance with the relative size of the respective opening through the gasket.

2. In a centralized lubricating installation for a mechanism having a plurality of distributed bearings to be lubricated, said installation being of the type comprising a central reservoir and pump and a branched conduit system for conducting lubricant from the pump to a plurality of outlets connected to said bearings, said outlets each including an apportioning unit; each apportioning unit comprising a porous cylindrical capillary member, a fitting enclosing said capillary member, and an annular gasket in said fitting having a central opening, said gasket serving to exert pressure upon the capillary member to hold it in position in the fitting and to control the area of flow passage therethrough.

3. In a centralized lubricating installation for a mechanism having a plurality of distributed bearings to be lubricated, said installation being of the type comprising a central reservoir and pump and a branched conduit system for conducting lubricant from the pump to a plurality of outlets connected to said bearings, said outlets each including an apportioning unit; each apportioning unit comprising an outlet fitting, a porous capillary flow obstructing filler retained therein, said filler being of resistance so high compared to the resistance of the conduit system that it will in itself determine the proportionate rate of flow through the outlet and said filler being provided with and clamped against an annular ring determining the area of the flow passage therethrough and the rating thereof.

4. In a centralized lubricating installation for a mechanism having a plurality of distributed bearings to be lubricated, said installation being of the type comprising a central reservoir and pump and a branched conduit system for conducting lubricant from the pump to a plurality of outlets connected to said bearings, said outlets each including an apportioning unit; each apportioning unit comprising an outlet fitting having a high resistance flow obstructing porous capillary cylindrical filler member retained therein, each filler being of resistance so high compared to the combined resistance of the system and of the bearings that it will in itself determine the proportionate rate of flow to the respective bearing substantially regardless of the diverse resistances of the system and of the bearing, and each filler being provided with and clamped against an annular disk determining the flow area therethrough, said annular disk determining diverse flow areas according to the rating of the fittings.

5. In a centralized lubricating installation for a mechanism having a plurality of distributed bearings to be lubricated, said installation being of the type comprising a central reservoir and pump and a branched conduit system for conducting lubricant from the pump to a plurality of outlets connected to said bearings, said outlets each including an apportioning unit; each apportioning unit comprising a fitting including an oil chamber, a compressible porous member positioned in said chamber, and means adjustably mounted in the chambers to vary the degree of compression of said porous members, said means having lubricating passages of different cross sectional areas at the different outlets.

6. In a centralized lubricating installation for a mechanism having a plurality of distributed bearings to be lubricated, said installation being of the type comprising a central reservoir and pump and a branched conduit system for conducting lubricant from the pump to a plurality of outlets connected to said bearings, said outlets each including an apportioning unit comprising a fitting including an oil chamber, a compressible porous member positioned in said chamber, means adjustably mounted in the chambers to vary the degree of compression of said porous members, said means having lubricating passages of different cross sectional areas to regulate the feed to the bearings, and a check valve to prevent the flow of lubricant to the bearing except when lubricant is under pressure.

FREDERICK H. GLEASON.